(12) United States Patent
Takakuwa et al.

(10) Patent No.: US 7,853,146 B2
(45) Date of Patent: Dec. 14, 2010

(54) OPTICAL TRANSMISSION APPARATUS

(75) Inventors: Makoto Takakuwa, Kawasaki (JP);
Futoshi Izumi, Kawasaki (JP);
Masahiro Yoshimoto, Kawasaki (JP);
Takahiro Hosokawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 130 days.

(21) Appl. No.: 11/496,499

(22) Filed: Aug. 1, 2006

(65) Prior Publication Data
US 2007/0036549 A1 Feb. 15, 2007

Related U.S. Application Data

(63) Continuation of application No. PCT/JP2004/002775, filed on Mar. 4, 2004.

(51) Int. Cl.
*H04J 14/00* (2006.01)
(52) U.S. Cl. ............................ 398/53; 398/180; 398/189
(58) Field of Classification Search ................... 398/45, 398/55, 22–25, 53–54, 180, 189
See application file for complete search history.

(56) References Cited

U.S. PATENT DOCUMENTS

| 4,696,063 | A | | 9/1987 | Schembri |
| 5,222,162 | A | * | 6/1993 | Yap et al. ...................... 385/14 |
| 5,739,933 | A | * | 4/1998 | Dembeck et al. .............. 398/45 |
| 5,831,752 | A | * | 11/1998 | Cotter et al. ................... 398/54 |
| 6,532,320 | B1 | | 3/2003 | Kikuchi et al. |

2002/0154373 A1 * 10/2002 Akashi ........................ 359/189

FOREIGN PATENT DOCUMENTS

JP 6-506814 7/1994

(Continued)

OTHER PUBLICATIONS

Japanese Office Action issued on Jan. 13, 2009 in corresponding Japanese Patent Application 2006-510579.

(Continued)

*Primary Examiner*—Dzung D Tran
(74) *Attorney, Agent, or Firm*—Staas & Halsey LLP

(57) ABSTRACT

An optical transmission apparatus that improves the reliability of system operation by efficiently limiting the line speed of a signal sent from a user with a guard mechanism. An optical branching section makes an optical signal branch in two directions. A through branching line passes an optical signal in its original condition and sends the optical signal as a through optical branch signal. A delay branching line delays an optical signal by a delay amount set and sends the optical signal as a delayed optical branch signal. An optical multiplexing section combines the through optical branch signal and the delayed optical branch signal. A line speed limitation section limits acceptance of the line speed of the optical signal inputted by generating a multiplexed optical signal that meets a pulse mask standard for an optical signal to be passed for the optical signal which is sent at a line speed lower than or equal to a line speed settled under contract with a user and which is to be passed and by setting the delay amount for generating a multiplexed optical signal that does not meet a pulse mask standard for an optical signal acceptance of which is to be refused for the optical signal which is sent at a line speed higher than the line speed settled under contract with the user and acceptance of which is to be refused.

5 Claims, 14 Drawing Sheets

FOREIGN PATENT DOCUMENTS

WO 87/01539 3/1987
WO 93/11579 6/1993

OTHER PUBLICATIONS

International Search Report dated Jun. 15, 2004 in corresponding PCT Patent Application No. PCT/JP2004/002775.

Patent Abstract of Japan, Japanese Publication No. 2002-094574, Published Mar. 29, 2002.

Patent Abstract of Japan, Japanese Publication No. 2002-094608, Published Mar. 29, 2002.

* cited by examiner

| SIGNAL CLASS | LENGTH OF OPTICAL FIBER REQUIRED FOR CAUSING DELAY CORRESPONDING TO ONE PERIOD (m) |
|---|---|
| STM-0(OC-1) | 3.85 |
| STM-1(OC-3) | 1.28 |
| STM-4(OC-12) | 0.32 |
| STM-16(OC-48) | 0.08 |
| STM-64(OC-192) | 0.02 |

OPTICAL TRANSMISSION APPARATUS

CROSS-REFERENCE TO RELATED APPLICATIONS

This application is a continuing application, filed under 35 U.S.C. §111(a), of International Application PCT/JP2004/002775, filed on Mar. 4, 2004.

BACKGROUND OF THE INVENTION (1) Field of the Invention

This invention relates to an optical transmission apparatus and, more particularly, to an optical transmission apparatus for transmitting an optical pulse signal.

(2) Description of the Related Art

Wavelength division multiplexing (WDM) multiplexes a number of optical signals with different wavelengths into a single optical fiber. By doing so, a plurality of signals are transmitted at the same time by one optical fiber. WDM is a core technique for an optical transmission system and has been developing rapidly.

FIG. 14 shows the structure of a WDM system. A WDM system 200 comprises an optical sending section 210 and an optical receiving section 220. The optical sending section 210 includes transponders 211-1 through 211-$n$, optical attenuators (ATT) 212-1 through 212-$n$, a MUX section 213, and an optical amplifier 214. The optical receiving section 220 includes an optical amplifier 221, a DMUX section 222, and transponders 223-1 through 223-$n$.

In the optical sending section 210, the transponders 211-1 through 211-$n$ correspond to wavelengths $\lambda 1$ through $\lambda n$ respectively. The transponders 211-1 through 211-$n$ convert the wavelength bands of input optical signals into narrow wavelength bands suitable for WDM and output the input optical signals. The ATTs 212-1 through 212-$n$ control the optical power of the input optical signals with the wavelengths $\lambda 1$ through $\lambda n$ and send them to the MUX section 213 at the next stage by which multiplexing is performed. The MUX section 213 multiplexes the wavelengths $\lambda 1$ through $\lambda n$ to generate a WDM signal (wavelength multiplexed signal). The optical amplifier 214 amplifies the WDM signal and outputs it onto an optical transmission line.

In the optical receiving section 220, the optical amplifier 221 receives and amplifies the WDM signal sent via the optical transmission line. The DMUX section 222 separates the WDM signal into the wavelengths $\lambda 1$ through $\lambda n$. The transponders 223-1 through 223-$n$ correspond to the wavelengths $\lambda 1$ through $\lambda n$ respectively. The transponders 223-1 through 223-$n$ convert the narrow bands of the optical signals after the separation into wavelength bands suitable for units on the user side and output them.

The number of the above transponders required for converting an interface between user units and WDM is equal to that of wavelengths which can be handled in the WDM system. Traditionally, the number of transponders which must be located also increases according to the number of kinds of line speeds which can be handled in a WDM system.

For example, it is assumed that the WDM system 200 provides a service at line speeds of 600 Mb/s and 2.4 Gb/s. Then the transponders 211-1 through 211-$n$ corresponding to a line speed of 600 Mb/s, the transponders 211-1 through 211-$n$ corresponding to a line speed of 2.4 Gb/s, the transponders 223-1 through 223-$n$ corresponding to a line speed of 600 Mb/s, and the transponders 223-1 through 223-$n$ corresponding to a line speed of 2.4 Gb/s must be located. That is to say, with the transponder 211-1 for converting the wavelength $\lambda 1$, two boards corresponding to line speeds of 600 Mb/s and 2.4 Gb/s, respectively, must be used. The same applies to the other transponders.

As a result, a WDM system which provides a service at line speeds of 600 Mb/s and 2.4 Gb/s by using the n wavelengths $\lambda 1$ through $\lambda n$ requires 2n transponders at the sending end. That is to say, this system requires n transponders which correspond to the n wavelengths $\lambda 1$ through $\lambda n$, respectively, and which correspond to a line speed of 600 Mb/s and n transponders which correspond to the n wavelengths $\lambda 1$ through $\lambda n$, respectively, and which correspond to a line speed of 2.4 Gb/s at the sending end. Similarly, this system requires 2n transponders at the receiving end. Accordingly, this system includes a total of 4n transponders. Conventionally, the number of transponders increases in this way not only according to the number of wavelengths used but also according to the number of kinds of line speeds used. Therefore, each time a function or the like is added, a great deal of effort is spent in maintaining and managing the system.

In recent years a bit free transponder which can convert the wavelength bands of input optical signals without depending on a transmission line speed in the synchronous digital hierarchy (SDH), the synchronous optical network (SONET), the gigabit Ethernet (Ethernet is a registered trademark) (GbE), or the like has been developed.

If such bit free transponders are used, there is no need to use boards according to line speeds. The number of the bit free transponders used should correspond to that of wavelengths used. (In the above example, one bit free transponder can handle line speeds of 600 Mb/s and 2.4 Gb/s. Accordingly, the number of bit free transponders used should correspond to that of the wavelengths used. That is to say, a total of 2n bit free transponders should be located at the sending and receiving ends.) However, there is no limit to the line speed of a signal sent from a user. Accordingly, control must be exercised in some way to maintain communication charges first settled by contract.

A technique for connecting a user LAN and the wide area LAN of a common carrier via an optical fiber transmission line and for band-limiting the amount of data according to a band settled under contract with a user has conventionally been proposed as a technique for limiting a signal from a user (see, for example, Japanese Unexamined Patent Publication No. 2002-94574 (paragraphs [0009]-[0030] and FIG. 1)).

The use of the above-mentioned bit free transponders obviates work, such as replacing boards or evaluating them one by one, which must otherwise be performed each time a line speed is changed. Therefore, a maintainer or a manager can manage a system efficiently.

However, if a bit free transponder which can relay signals sent at various line speeds is used, a guard mechanism by which a signal sent at a certain line speed cannot be transmitted is needed. If such a guard mechanism is not used, communication charges first settled under contract with each user cannot be maintained because a communication charge system is determined on the basis of line speed from the viewpoint of each user who makes use of a communication system. As a result, the communication system cannot be operated properly.

That is to say, if a conventional transponder without the function of a bit free transponder is used and a line speed of 600 Mb/s is settled first under contract with a user, then a transponder corresponding to a line speed of 600 Mb/s is located in the system. Accordingly, even if the user attempts to perform high-speed communication at a line speed higher than 600 Mb/s, the user cannot communicate. As a result, the system is operated properly in accordance with the initial contract.

With a system in which a bit free transponder is located, however, band conversion can be performed regardless of line speed. Accordingly, even if a line speed of 600 Mb/s is settled under contract with a user, a signal sent at a higher line speed (2.4 Gb/s, for example) can be transmitted by the communication function of the system regardless of the line speed settled by contract.

Therefore, with a system using bit free transponders without a guard mechanism, problems arise. For example, a user who made a low-speed line contract can use a high-speed line if the user does not inform about it (a user who made a low-speed line contract with malice may utilize a high-speed line service). In such a case, communication charges first settled under contract with the user cannot be maintained, resulting in a deterioration in the reliability of the operation of the system and the quality of services.

With the above conventional technique (Japanese Patent Laid-Open Publication No. 2002-94574), on the other hand, an optical signal sent from a user is converted into an electrical signal. The band of a user signal as an electrical signal is limited by discarding frames outside the band settled by contract. However, most of current WDM systems process optical signals transmitted without converting them into electrical signals. Accordingly, the technique which performs band limitation in the above way cannot be applied to such systems.

SUMMARY OF THE INVENTION

The present invention was made under the background circumstances described above. An object of the present invention is to provide an optical transmission apparatus which improves the reliability of system operation by efficiently limiting the line speed of a signal sent from a user in the case of using reproduction relay devices such as bit free transponders.

In order to achieve the above object, an optical transmission apparatus for transmitting an optical signal is provided. This optical transmission apparatus comprises an input port for inputting an optical signal sent via a line and a line speed limitation section including an optical branching section for making the optical signal branch in two directions, a through branching line for passing an optical signal outputted in one direction in an original condition and for sending the optical signal as a through optical branch signal, a delay branching line for delaying an optical signal outputted in an other direction by a delay amount set and for sending the optical signal as a delayed optical branch signal, and an optical multiplexing section for combining the through optical branch signal and the delayed optical branch signal to generate a multiplexed optical signal; wherein the line speed limitation section limits acceptance of a line speed of the optical signal inputted by generating the multiplexed optical signal that meets a pulse mask standard for an optical signal to be passed for the optical signal which is sent at a line speed lower than or equal to a line speed settled under contract with a user and which is to be passed and by setting the delay amount for generating the multiplexed optical signal that does not meet a pulse mask standard for an optical signal acceptance of which is to be refused for the optical signal which is sent at a line speed higher than the line speed settled under contract with the user and acceptance of which is to be refused.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 shows the length of an optical fiber required for causing a delay corresponding to one period for each signal class.

DESCRIPTION OF THE PREFERRED EMBODIMENTS

Figure 1:
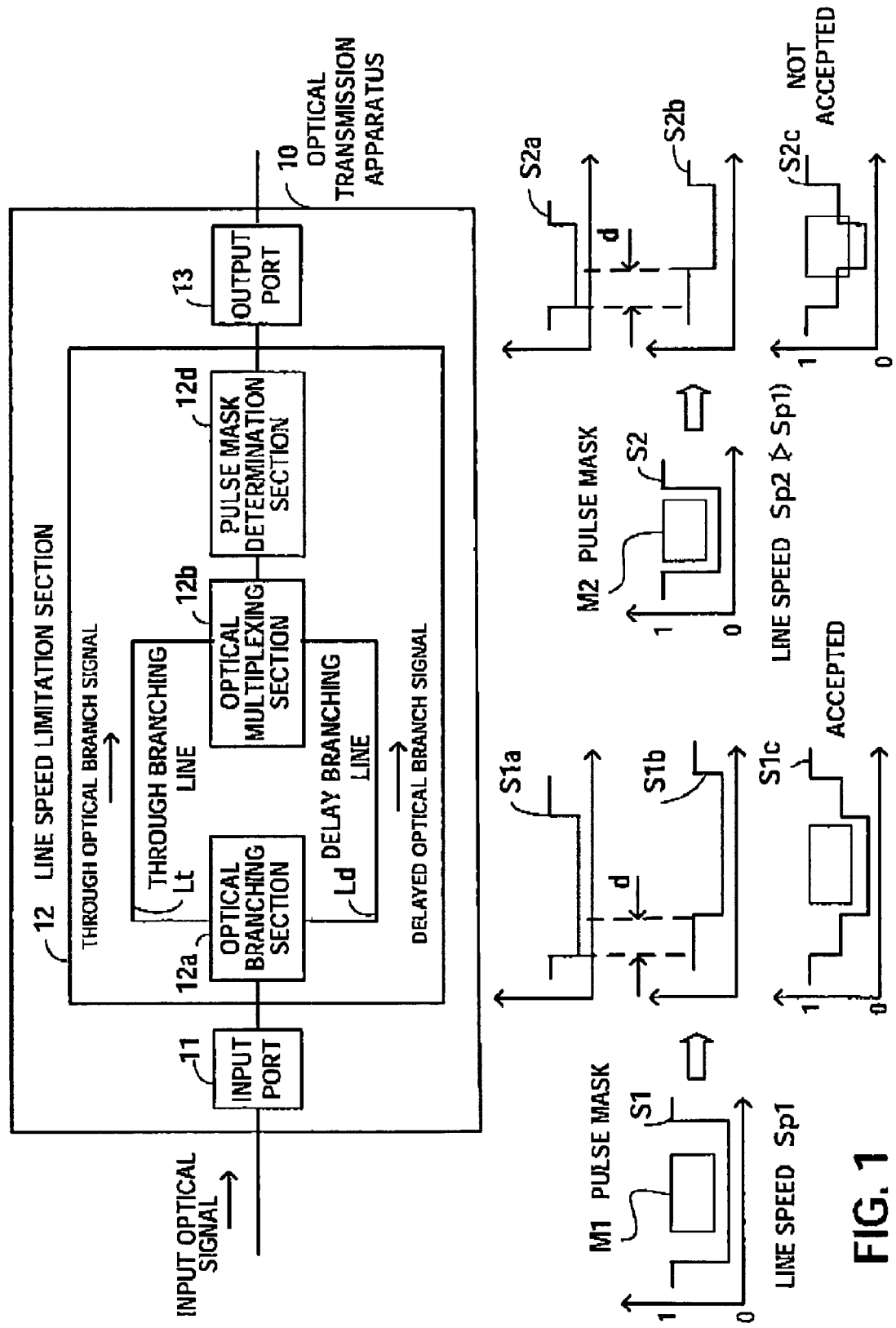
FIG. 1 is a view for describing the principles underlying an optical transmission apparatus according to the present invention.

Embodiments of the present invention will now be described with reference to the drawings. FIG. 1 is a view for describing the principles underlying an optical transmission apparatus according to the present invention. An optical transmission apparatus 10 includes an input port 11, a line speed limitation section 12, and an output port 13 and transmits an optical signal.

The input port 11 inputs an optical signal sent via a line. The output port 13 outputs an optical signal processed in the apparatus onto a transmission line. The line speed limitation section 12 includes an optical branching section 12a, an optical multiplexing section 12b, a pulse mask determination section 12d, a through branching line Lt, and a delay branching line Ld.

The optical branching section 12a makes the optical signal inputted branch in two directions, outputs one optical signal to the through branching line Lt, and outputs the other optical signal to the delay branching line Ld. The through branching line Lt carries the optical signal inputted thereto in its original condition and sends it as a through optical branch signal. The delay branching line Ld delays the optical signal inputted thereto by a delay amount set and sends it as a delayed optical branch signal. The optical multiplexing section 12b combines the through optical branch signal and the delayed optical branch signal to generate a multiplexed optical signal.

In the line speed limitation section 12 including the optical branching section 12a, the through branching line Lt, the delay branching line Ld, and the optical multiplexing section 12b, a predetermined delay amount is set in advance on the delay branching line Ld to control acceptance of line speed.

Figure 2:
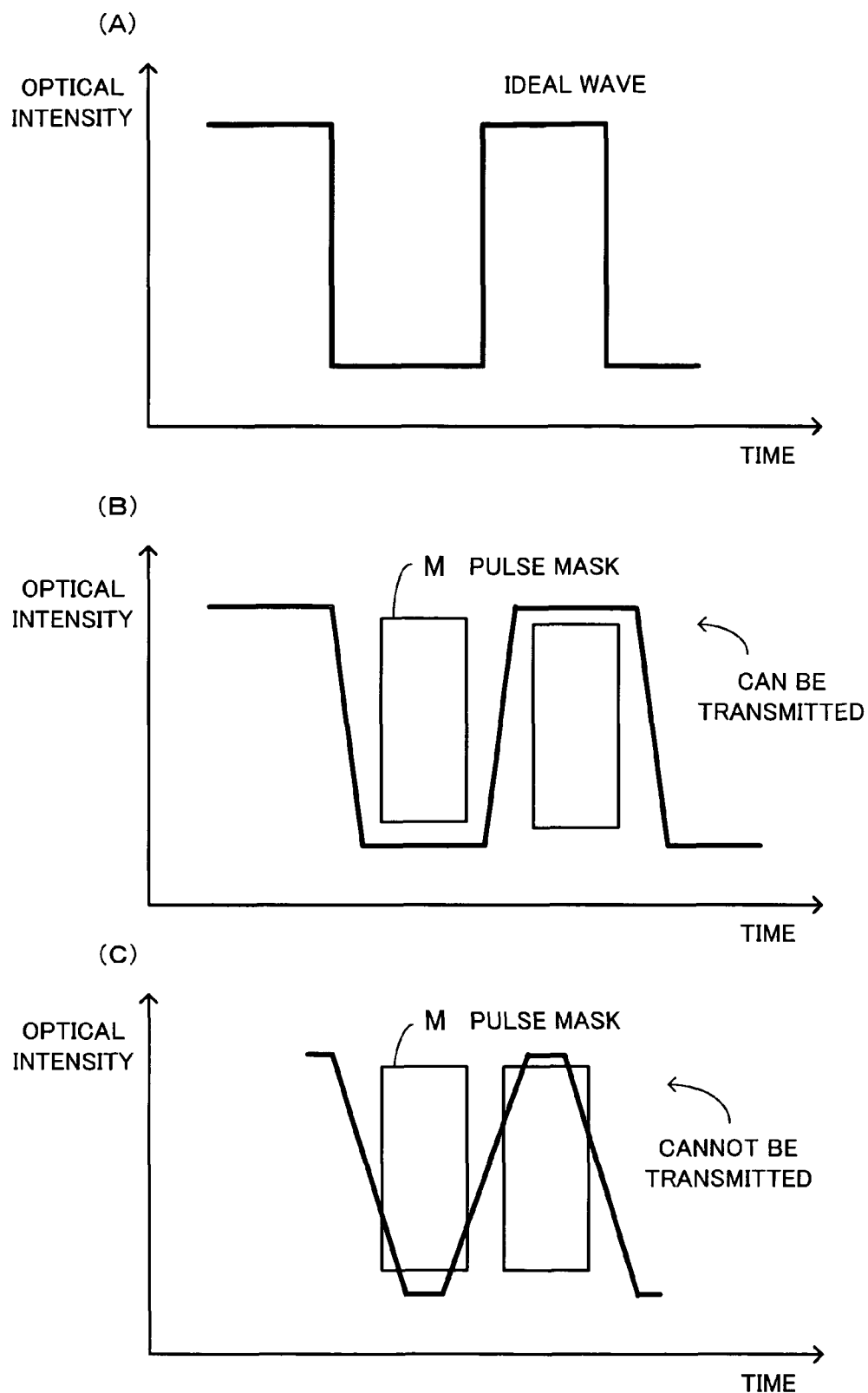
FIGS. 2(A), 2(B), and 2(C) are views for describing a pulse mask, FIG. 2(A) showing a rectangular wave, FIG. 2(B) showing a waveform which meets a pulse mask standard, and FIG. 2(C) showing a waveform which does not meet the pulse mask standard.

A delay amount is set so that a multiplexed optical signal which meets a pulse mask (described later in FIG. 2) standard for an optical signal to be passed will be generated for an optical signal which is sent at a line speed lower than or equal to a line speed settled under contract with a user and which is to be passed. In addition, a delay amount is set so that a multiplexed optical signal that does not meet a pulse mask standard for an optical signal acceptance of which is to be refused will be generated for an optical signal which is sent at a line speed higher than the line speed settled under contract with the user and acceptance of which is to be refused. As a result, acceptance of the line speed of an input optical signal is limited.

The limitation of acceptance of line speed according to the present invention will now be described by using optical waveforms shown in FIG. 1. The vertical axes and the horizontal axes of the optical waveforms shown in FIG. 1 indicate optical intensity and time respectively. The optical branching section 12a makes an optical signal inputted to the line speed limitation section 12 branch to the through branching line Lt and the delay branching line Ld. An optical signal which runs along an optical path on the through branching line Lt is inputted to the optical multiplexing section 12b in its original condition. An optical signal which runs along an optical path on the delay branching line Ld is delayed by set time and is inputted to the optical multiplexing section 12b. The optical branching section 12a makes the original input optical signal branch in the two directions. As a result, the through optical branch signal and the delayed optical branch signal are obtained. Accordingly, the optical intensity of the through optical branch signal and the delayed optical branch signal is equal to half of the optical intensity of the original input optical signal.

The optical multiplexing section 12b combines the through optical branch signal and the delayed optical branch signal between which a slight difference in phase (phase of optical pulse and not phase of optical wave) arises by a delay amount set. If the intensity of the through optical branch signal and the intensity of the delayed optical branch signal are both in the ON state when they reach the optical multiplexing section 12b, then an output multiplexed signal goes into the ON state indicative of the logic "1".

If the intensity of the through optical branch signal and the intensity of the delayed optical branch signal are both in the OFF state when they reach the optical multiplexing section 12b, then the output multiplexed signal goes into the OFF state indicative of the logic "0". If the through optical branch signal differs from the delayed optical branch signal in intensity (one is in the ON state and the other is in the OFF state) when they reach the optical multiplexing section 12b, then the output multiplexed signal goes into an undefined state. In this case, it is not known whether the output multiplexed signal corresponds to the logic "0" or "1," and its intensity is exactly intermediate between the two levels corresponding to the ON and OFF states.

It is assumed that a line speed settled first under contract with the user is Sp1 and that a delay amount set on the delay branching line Ld is d. An optical signal sent at a line speed lower than or equal to Sp1 is accepted and acceptance of an optical signal sent at a line speed higher than Sp1 is refused.

An input optical waveform S1 indicates the waveform of an optical signal which is sent at a line speed of Sp1 and which is at an input point of the optical branching section 12a. It is assumed that a pulse mask for the optical signal sent at a line speed of Sp1 is M1. A through optical waveform S1a indicates the waveform of a through optical branch signal which has run through the through branching line Lt at a line speed of Sp1 and which is at an input point of the optical multiplexing section 12b. A delayed optical waveform S1b indicates the waveform of a delayed optical branch signal which has run through the delay branching line Ld at a line speed of Sp1, which is delayed by the delay amount d, and which is at an input point of the optical multiplexing section 12b. A multiplexed waveform S1c indicates the waveform of a multiplexed optical signal which is sent at a line speed of Sp1 and which is at an output point of the optical multiplexing section 12b where the through optical waveform S1a and the delayed optical waveform S1b are combined.

The multiplexed waveform S1c is obtained by combining the through optical waveform S1a and the delayed optical waveform S1b delayed by the delay amount d. Therefore, as shown in FIG. 1, the multiplexed waveform S1c includes the logic "0," the logic "1," and an undefined state and looks like stairs.

The pulse mask M1 indicates waveform width which can be received. If the pulse mask M1 and the multiplexed waveform S1c like stairs (level of which is indefinite) do not overlap, then the multiplexed waveform S1c meets a standard for waveform width which can be received (that is to say, the multiplexed waveform S1c satisfies a signal transmission margin specified by the pulse mask M1 for the optical signal sent at a line speed of Sp1). Accordingly, the optical signal sent at a line speed of Sp1 is accepted as a signal sent at a line speed lower than or equal to the line speed settled by contract.

It is assumed that an optical signal is sent at a line speed of Sp2 (Sp1<Sp2). An input optical waveform S2 indicates the waveform of the optical signal which is sent at a line speed of Sp2 and which is at the input point of the optical branching section 12a. It is assumed that a pulse mask for the optical signal sent at a line speed of Sp2 is M2. A through optical waveform S2a indicates the waveform of a through optical branch signal which has run through the through branching line Lt at a line speed of Sp2 and which is at the input point of the optical multiplexing section 12b. A delayed optical waveform S2b indicates the waveform of a delayed optical branch signal which has run through the delay branching line Ld at a line speed of Sp2, which is delayed by the delay amount d, and which is at the input point of the optical multiplexing section 12b. A multiplexed waveform S2c indicates the waveform of a multiplexed optical signal which is sent at a line speed of Sp2 and which is at the output point of the optical multiplexing section 12b where the through optical waveform S2a and the delayed optical waveform S2b are combined.

The multiplexed waveform S2c is obtained by combining the through optical waveform S2a and the delayed optical waveform S2b delayed by the delay amount d. Therefore, as shown in FIG. 1, the multiplexed waveform S2c looks like stairs. The pulse mask M2 is narrowed by the multiplexed waveform S2c like stairs (the pulse mask M2 and the multiplexed waveform S2c overlap) and a standard is not met (that is to say, the multiplexed waveform S2c does not satisfy a signal transmission margin specified by the pulse mask M2 for the optical signal sent at a line speed of Sp2). Accordingly, the optical signal sent at a line speed of Sp2 is a signal sent at a line speed higher than the line speed settled by contract and acceptance of this signal is refused.

As stated above, a delay amount should be set so that the waveform of a multiplexed signal will narrow to the vicinity of a pulse mask for an optical pulse signal sent. By doing so, a pulse signal sent at a line speed higher than a permitted line speed is detected by the pulse mask. Such a pulse signal does not satisfy the pulse mask, so line speed can be limited.

The optical transmission apparatus 10 includes a pulse mask determination section 12d for determining whether the waveform of a multiplexed signal narrows a pulse mask. If the pulse mask determination section 12d determines that the waveform of the multiplexed signal narrows the pulse mask, then the multiplexed signal is interrupted in the optical transmission apparatus 10 (even if an optical signal which does not satisfy the pulse mask is transmitted to a subsequent stage, an error actually occurs by itself in the system or a user's unit and communication cannot be performed). If the determination that the multiplexed signal does not satisfy the pulse mask is made, the alarm may be given because an optical signal sent at a line speed higher than the line speed settled by contract is deemed to be inputted.

A pulse mask will now be described. FIGS. 2(A), 2(B), and 2(C) are views for describing a pulse mask. FIG. 2(A) shows a rectangular wave. FIG. 2(B) shows a waveform which meets a pulse mask standard. FIG. 2(C) shows a waveform which does not meet the pulse mask standard.

The ON and OFF states of an optical pulse used for optical transmission are indicated by the logic "1" and the logic "0" respectively. With an ideal optical pulse, switching between the ON and OFF states is performed instantly and the rectangular wave (time taken to rise from the OFF state to the ON state and to fall from the ON state to the OFF state is zero) shown in FIG. 2(A) is obtained. Actually, however, switching between the ON and OFF states cannot be performed instantly. Accordingly, as shown in FIG. 2(B) or 2(C), a waveform with a slope is obtained (time taken to rise from the OFF state to the ON state and to fall from the ON state to the OFF state is not zero).

The width of a waveform which can be received at the receiving end is specified by a pulse mask. As shown in FIG. 2(B), an optical pulse the width of which is wider than the pulse mask M can be transmitted. As shown in FIG. 2(C), however, an optical pulse the width of which is narrower than the pulse mask M does not meet a standard and cannot be transmitted. That is to say, if the waveform of an optical pulse does not overlap a pulse mask area (if the waveform of an optical pulse is outside a pulse mask area), then the optical pulse can be transmitted. If the waveform of an optical pulse overlaps the pulse mask area, then the optical pulse does not meet a pulse mask standard and cannot be transmitted (parameters for specifying a pulse mask for an OC(optical carrier)-3 or OC-12 optical signal, for example, are stipulated in GR-253-CORE and see the recommendation for details).

Figure 3:
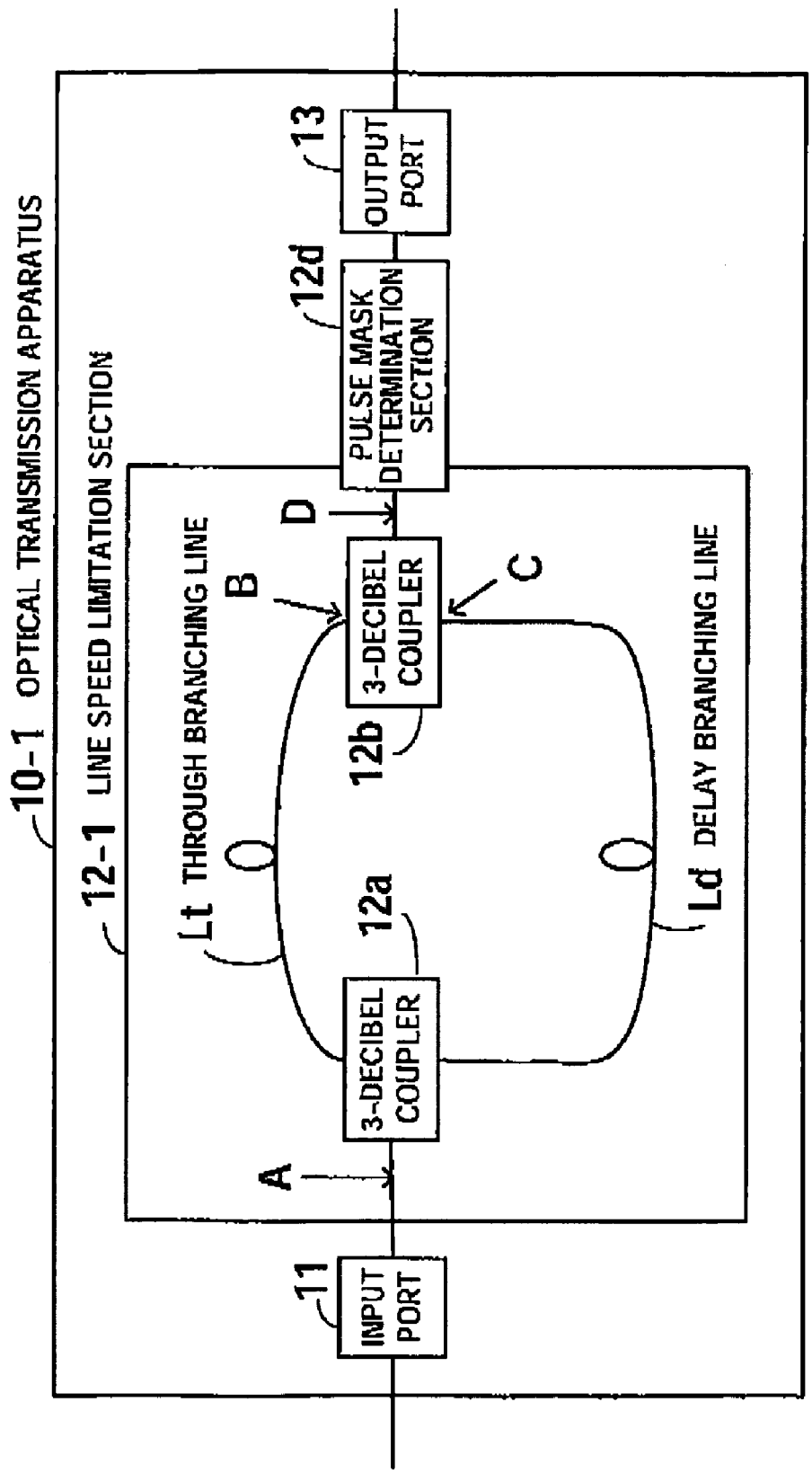
FIG. 3 shows the structure of an optical transmission apparatus according to a first embodiment of the present invention.

The concrete structure and operation of the optical transmission apparatus 10 according to the present invention will now be described. FIG. 3 shows the structure of an optical transmission apparatus according to a first embodiment of the present invention. The letters A through D in FIG. 3 will be used for describing FIGS. 6 and 7. An optical transmission apparatus 10-1 according to a first embodiment of the present invention includes an input port 11, a line speed limitation section 12-1, and an output port 13. The line speed limitation section 12-1 includes 3-decibel couplers 12a and 12b corresponding to an optical branching section and an optical multiplexing section respectively, a through branching line Lt, a delay branching line Ld, and a pulse mask determination section 12d. The 3-decibel couplers 12a and 12b are cord-patched (connected by (connected by cables) by the through branching line Lt and the delay branching line Ld. The through branching line Lt and the delay branching line Ld are optical fiber cables. The cable used as the delay branching line Ld is longer than the cable used as the through branching line Lt by length necessary for giving a delay amount required.

The 3-decibel coupler 12a for branching makes an optical signal inputted from the input port 11 branch. After the branching, one optical signal runs along an optical path on the through branching line Lt and reaches the 3-decibel coupler 12b for multiplexing in its original condition. The other optical signal runs along an optical path on the delay branching line Ld which is longer than the optical path on the through branching line Lt, is delayed, and reaches the 3-decibel coupler 12b for multiplexing.

The 3-decibel coupler 12b for multiplexing combines these two optical signals between which there is a phase difference. In this case, in order to obtain a delay amount by which a pulse mask does not get out of shape for an optical signal which is sent at a line speed lower than or equal to a line speed settled by contract and which is to be passed and by which the pulse mask gets out of shape for an optical signal which is sent at a line speed higher than the line speed settled by contract and acceptance of which is to be refused, an optical path difference is determined by controlling the difference between the lengths of the cable used as the through branching line Lt and the cable used as the delay branching line Ld (the method of keeping the length of the cable used as the through branching line Lt constant and changing the length of the cable used as the delay branching line Ld should be adopted).

Figure 4:
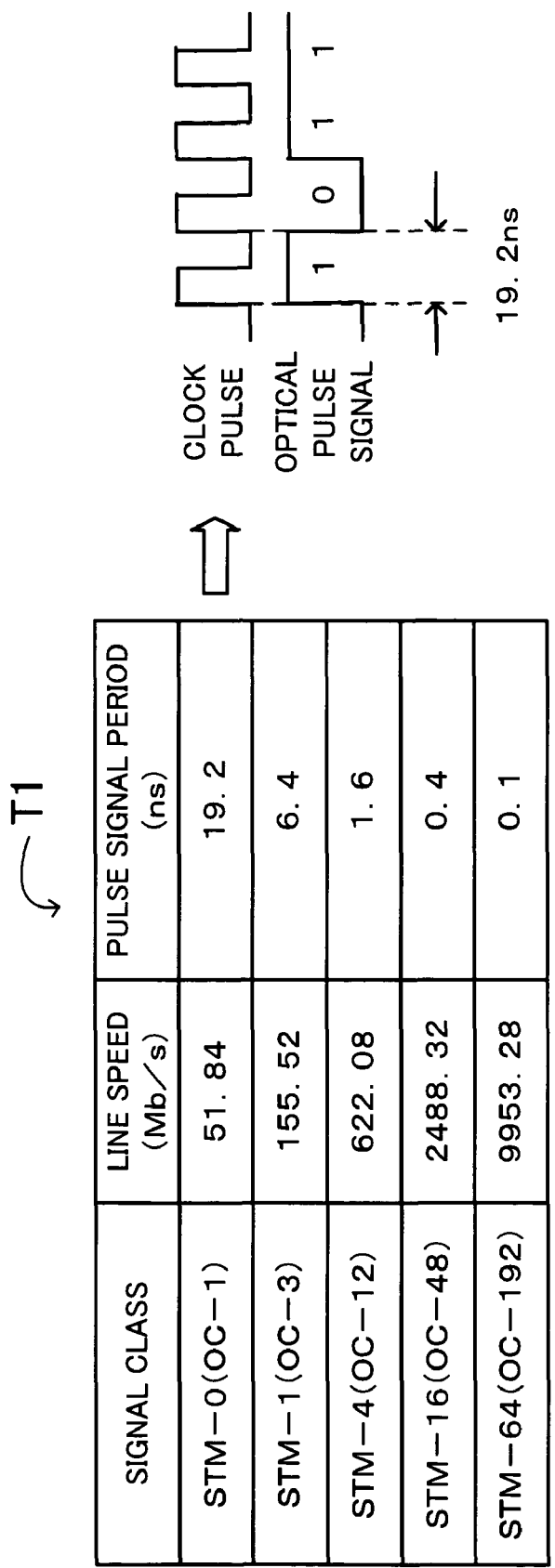
FIG. 4 shows the correspondence between a line speed and a pulse period for each signal class.

FIG. 4 shows the correspondence between a line speed and a pulse period for each signal class. A table T1 shows a typical line speed (Mb/s) and a signal pulse period (ns) for each signal class in the SDH (SONET). With an STM(synchronous transport module)-4 optical frame in SDH (corresponding to an OC-12 optical frame in SONET), for example, a line speed is 622.08 Mb/s (hereinafter mentioned as 600 Mb/s) and a pulse period is 1.6 ns. With STM-16 (OC-48), a line speed is 2488.32 Mb/s (hereinafter mentioned as 2.4 Gb/s) and a pulse period is 0.4 ns.

FIG. 5 shows the length of an optical fiber required for causing a delay corresponding to one period for each signal class. A table T2 shows the length of an optical fiber required for causing a delay corresponding to one period for each signal class in the SDH (SONET). With STM-4, for example, the table T1 shows that a pulse period is 1.6 ns. The table T2 shows that an optical fiber with a length of 32 cm should be used for causing a delay of 1.6 ns corresponding to one period.

It is assumed that if the difference in phase between a through optical branch signal which has run through the through branching line Lt and a delayed optical branch signal which has run through the delay branching line Ld is, for example, a fourth of a period, a pulse mask for a multiplexed signal gets out of shape (a phase difference by which a pulse mask gets out of shape differs among different pulse masks). In addition, it is assumed that the line speed limitation section 12-1 through which an STM-4 signal passes and through which an STM-16 signal does not pass is made.

With STM-16, as can be seen from the table T2, a cable with a length of 8 cm causes a delay corresponding to one period (0.4 ns). Accordingly, the difference in length between the cable used as the through branching line Lt and the cable used as the delay branching line Ld should be set to 2 cm (=8 cm/4). By doing so, the difference in phase between the two optical signals becomes 0.1 ns (0.4 ns/4) corresponding to a fourth of the period at multiplexing time and the two optical signals are inputted to the 3-decibel coupler 12b for multiplexing. As a result, an STM-16 pulse mask gets out of shape.

With STM-4, as can be seen from the table T2, a cable with a length of 32 cm causes a delay corresponding to one period (1.6.ns). To cause a delay corresponding to a fourth of the period, the difference in length between the cable used as the through branching line Lt and the cable used as the delay branching line Ld must be set to 8 cm (=32 cm/4). With STM-4, a pulse mask gets out of shape when a phase difference is 0.4 ns (1.6 ns/4) corresponding to a fourth of the period. If the difference in length between the cable used as the through branching line Lt and the cable used as the delay branching line Ld is 2 cm, the STM-4 pulse mask does not get out of shape because a margin of 0.3 ns is left compared with STM-16.

Therefore, an adjustment should be made so that the difference in length between the cable used as the through branching line Lt and the cable used as the delay branching line Ld will be 2 cm. By doing so, an STM-4 optical signal sent at a line speed of 600 Mb/s can be accepted as a transmittable signal. Acceptance of an STM-16 optical signal sent at a line speed of 2.4 Gb/s can be refused for the reason that it is not a transmittable signal.

Figure 6:
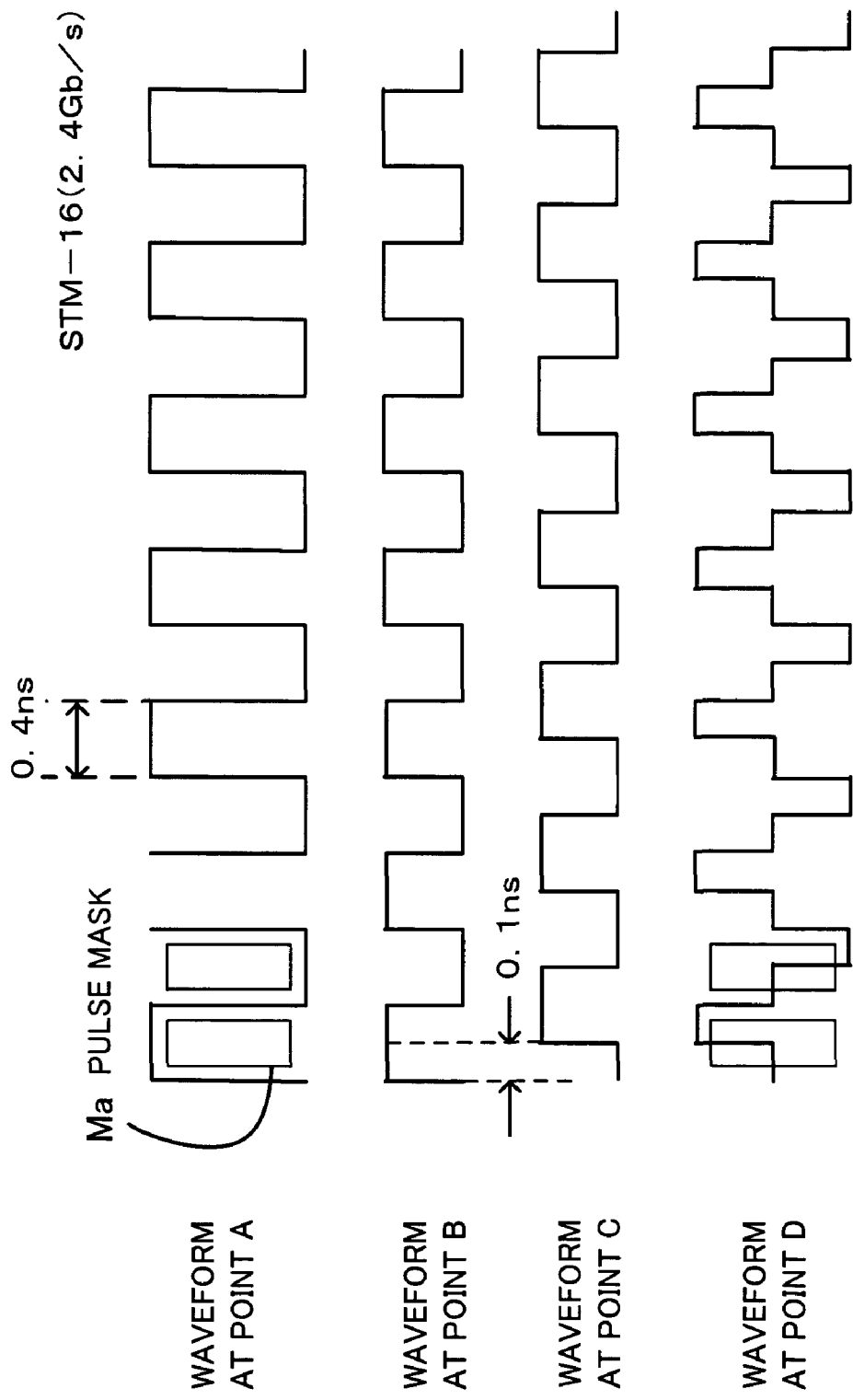
FIG. 6 is a time chart showing an STM-16 multiplexed signal by which a pulse mask gets out of shape.

FIG. 6 is a time chart showing an STM-16 multiplexed signal by which a pulse mask gets out of shape. In FIG. 6, the waveforms of an STM-16 signal (sent at a line speed of 2.4 Gb/s) at the points A through D in FIG. 3 are shown. The waveform at the point A indicates the signal which has not branched yet. The waveform at the point B indicates the through optical branch signal inputted to the 3-decibel coupler 12b for multiplexing. The waveform at the point C indicates the delayed optical branch signal inputted to the 3-decibel coupler 12b for multiplexing. The waveform at the point D indicates the multiplexed signal.

It is assumed that the STM-16 pulse mask is Ma. The difference in length between the cable used as the through branching line Lt and the cable used as the delay branching line Ld is 2 cm, so the difference in phase between the through optical branch signal and the delayed optical branch signal is 0.1 ns. If the phase difference is 0.1 ns corresponding to a fourth of the period, the STM-16 multiplexed signal generated by combining the through optical branch signal and the delayed optical branch signal overlaps the pulse mask Ma.

Figure 7:
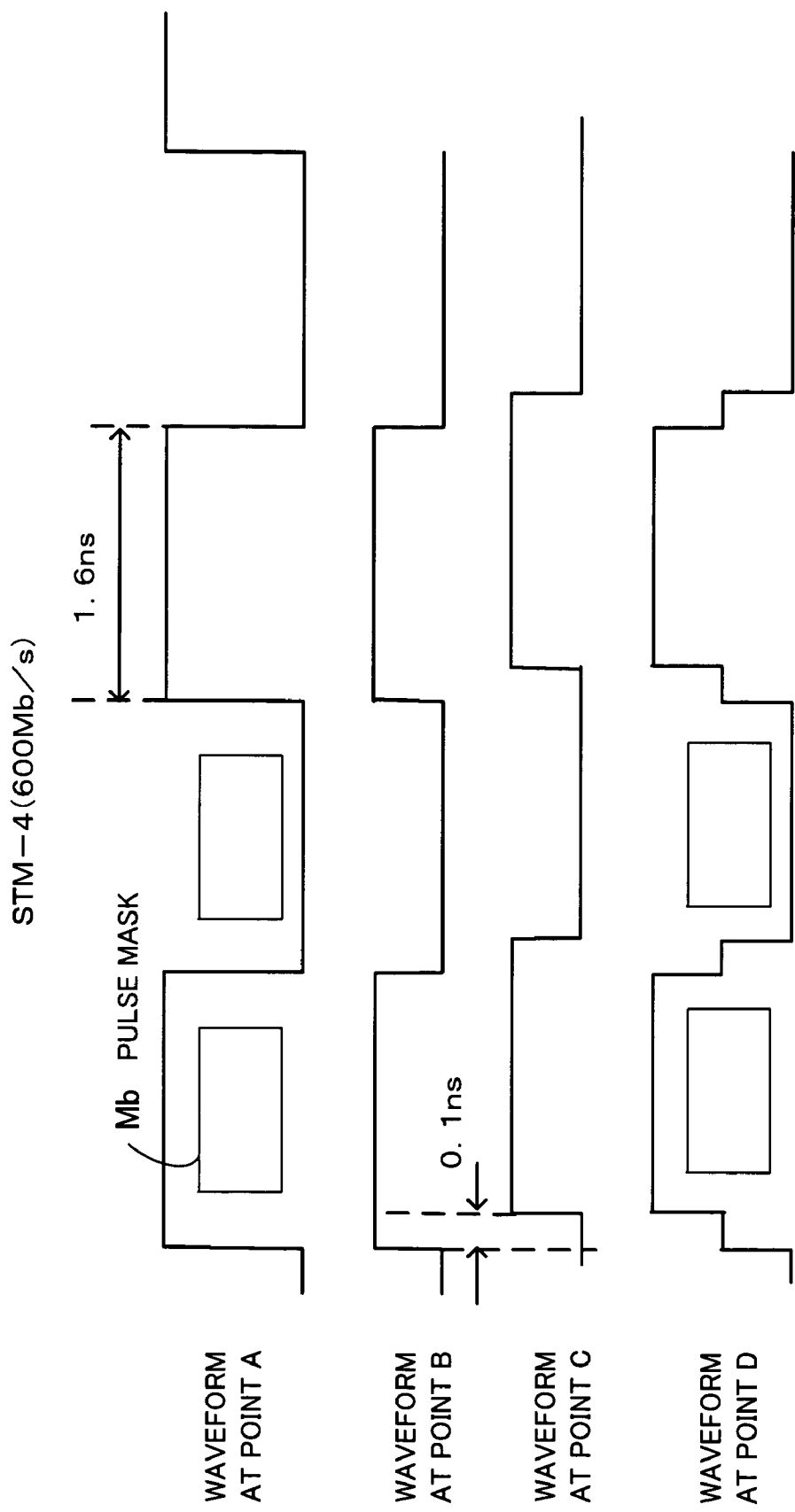
FIG. 7 is a time chart showing an STM-4 multiplexed signal by which a pulse mask does not get out of shape.

FIG. 7 is a time chart showing an STM-4 multiplexed signal by which a pulse mask does not get out of shape. In FIG. 7, the waveforms of an STM-4 signal (sent at a line speed of 600 Mb/s) at the points A through D in FIG. 3 are shown. It is assumed that the STM-4 pulse mask is Mb. The difference in length between the cable used as the through branching line Lt and the cable used as the delay branching line Ld is 2 cm and the difference in phase between the through optical branch signal and the delayed optical branch signal is 0.1 ns. With STM-4, the phase difference of 0.1 ns corresponds to a sixteenth of the period. Therefore, the multiplexed signal generated by combining the through optical branch signal and the delayed optical branch signal does not overlap the pulse mask Mb and fully meets the standard of the pulse mask Mb.

Figure 8:
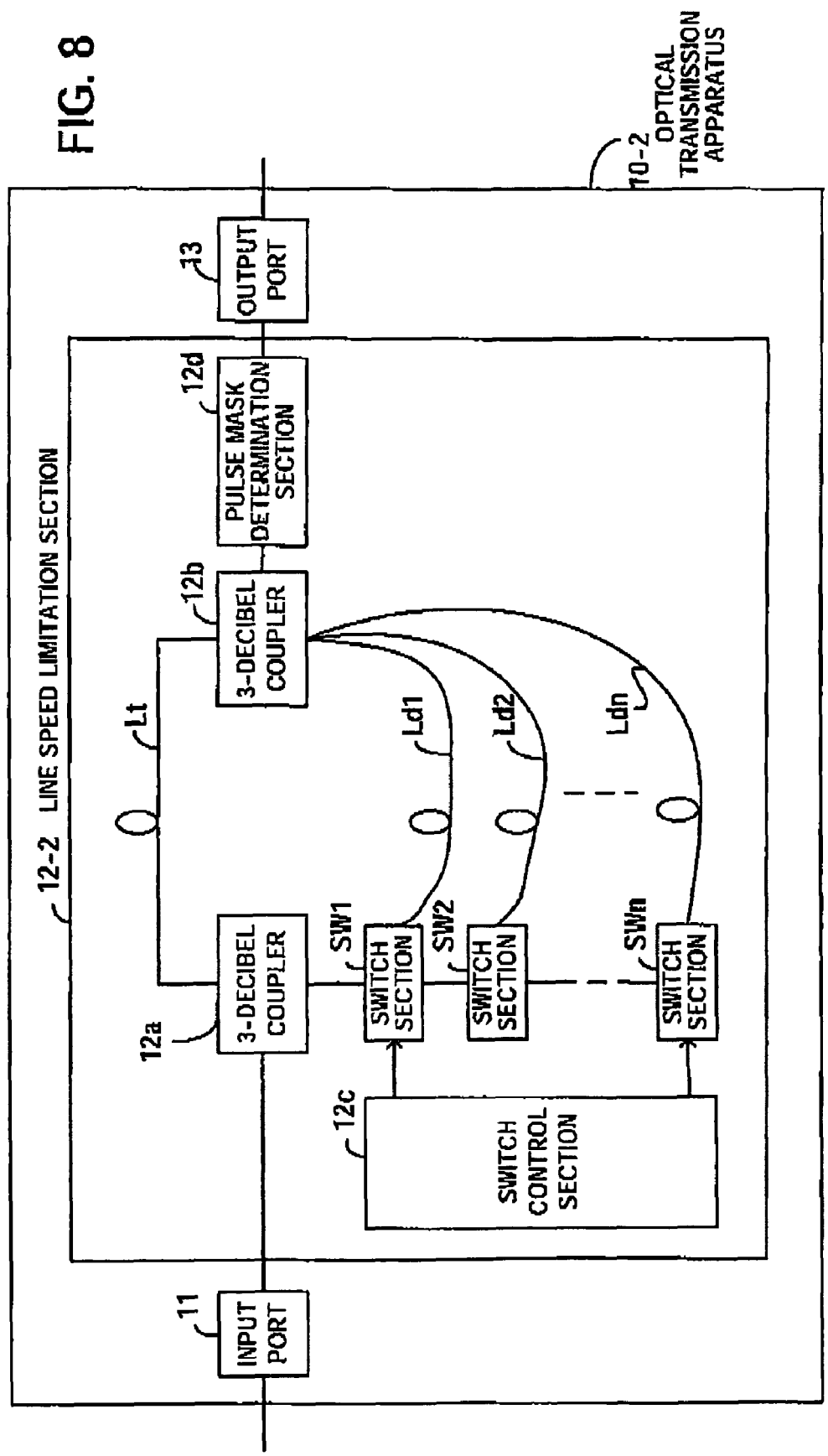
FIG. 8 shows the structure of an optical transmission apparatus according to a second embodiment of the present invention.

An optical transmission apparatus 10 according to a second embodiment of the present invention will now be described. FIG. 8 shows the structure of an optical transmission apparatus according to a second embodiment of the present invention. An optical transmission apparatus 10-2 according to a second embodiment of the present invention includes an input port 11, a line speed limitation section 12-2, and an output port 13. The line speed limitation section 12-2 includes 3-decibel couplers 12a and 12b corresponding to an optical branching section and an optical multiplexing section respectively, a switch control section 12c, a pulse mask determination section 12d, switch sections SW1 through SWn, a through branching line Lt, and delay branching lines Ld1 through Ldn. The optical transmission apparatus 10-2 differs from the optical transmission apparatus 10-1 shown in FIG. 3 in that it includes the switch control section 12c, the switch sections SW1 through SWn, and the n delay branching lines Ld1 through Ldn. Accordingly, these components will be described.

Each of the delay branching lines Ld1 through Ldn differs from the through branching line Lt in cable length so that different delay amounts will be set according to delay branching lines. The switch sections SW1 through SWn on-off-controls switches on the basis of a designation signal sent from the switch control section 12c. When an appropriate switch section is turned on, one of the delay branching lines Ld1 through Ldn is selected. As a result, a delayed optical branch signal outputted from the 3-decibel coupler 12a for branching runs through the selected delay branching line and reaches the 3-decibel coupler 12b for multiplexing.

For example, if the switch section SW2 is turned on, the delay branching line Ld2 is selected. As a result, a delayed optical branch signal outputted from the 3-decibel coupler 12a for branching runs through the delay branching line Ld2 and reaches the 3-decibel coupler 12b for multiplexing. In this case, the cable lengths of the delay branching lines Ld1 through Ldn are adjusted with an optical path along which an optical signal runs through a switch section taken into consideration.

It is assumed that the line speed limitation section 12-2 which can accept an STM-4 signal and a signal sent at a line speed lower than that of an STM-4 signal, which can refuse acceptance of an STM-16 signal and an STM-64 signal sent at line speeds higher than the line speed of an STM-4 signal, which can accept an STM-1 signal and a signal sent at a line speed lower than that of an STM-1 signal, and which can refuse acceptance of an STM-4 signal, an STM-16 signal, and an STM-64 signal sent at line speeds higher than the line speed of an STM-1 signal is made. As stated above, it is assumed that if the difference in phase between a through optical branch signal and a delayed optical branch signal is a fourth of a period, a pulse mask for a multiplexed signal gets out of shape. As described above, if an optical path difference is 2 cm, an STM-4 signal passes through the line speed limitation section 12-2 and an STM-16 or STM-64 signal does not pass through the line speed limitation section 12-2. Therefore, an adjustment should be made so that the difference between an optical path including the switch section SW1 and the first delay branching line Ld1 and an optical path including the through branching line Lt will be 2 cm.

With STM-4, as can be seen from the table T2, a cable with a length of 32 cm causes a delay corresponding to one period. Therefore, an adjustment should be made so that the difference between an optical path including the switch sections SW1 and SW2 and the second delay branching line Ld2 and an optical path including the through branching line Lt will be 8 cm. By doing so, the difference in phase between the through optical branch signal and the delayed optical branch signal becomes a fourth of the period (as can be seen from the table T1, a delay of 0.4 ns) at multiplexing time. These signals are inputted to the 3-decibel coupler 12b for multiplexing, so pulse masks for an STM-4 signal and signals sent at line speeds higher than that of an STM-4 signal get out of shape. That is to say, an STM-1 signal and a signal sent at a line speed lower than that of an STM-1 signal pass through the line speed limitation section 12-2 and an STM-4 signal, an STM-16 signal, or an STM-64 signal sent at a line speed higher than that of an STM-1 signal does not pass through the line speed limitation section 12-2.

Therefore, by turning on the switch section SW1, line speed limitation by which signals sent at line speeds lower than or equal to the line speed of an STM-4 signal are accepted and by which acceptance of an STM-16 signal and an STM-64 signal sent at line speeds higher than the line speed of an STM-4 signal is refused can be realized. By turning on the switch section SW2, line speed limitation by which signals sent at line speeds lower than or equal to the line speed of an STM-1 signal are accepted and by which acceptance of an STM-4 signal, an STM-16 signal, and an STM-64 signal sent at line speeds higher than the line speed of an STM-1 signal is refused can be realized.

As stated above, in the second embodiment of the present invention line speed acceptance can be controlled flexibly by selecting a delay branching line having a delay amount required from among the delay branching lines Ld1 through Ldn with the switch sections SW1 through SWn.

The following structure may be adopted as a modification of the first or second embodiment of the present invention. A branching coupler is located at an output stage of the 3-decibel coupler 12b for multiplexing. A monitor port used for monitoring a multiplexed signal which is outputted from the 3-decibel coupler 12b for multiplexing and which is made to branch by the branching coupler is located. By adopting this structure, an operator can observe the multiplexed signal in an in-service state, so he/she can check the relationship between the multiplexed signal and a pulse mask.

Figure 9:
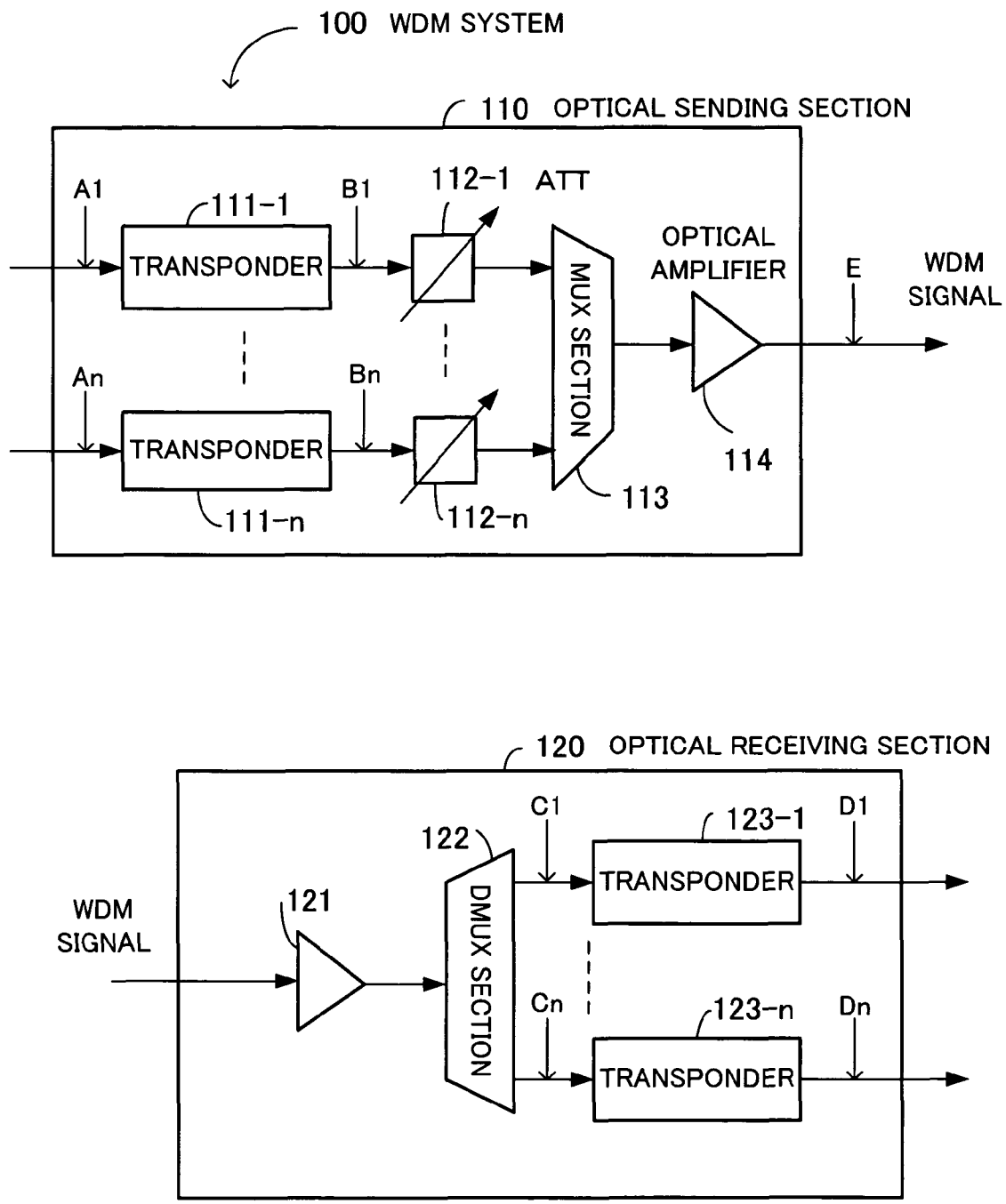
FIG. 9 shows the structure of a WDM system including the optical transmission apparatus.
Figure 14:
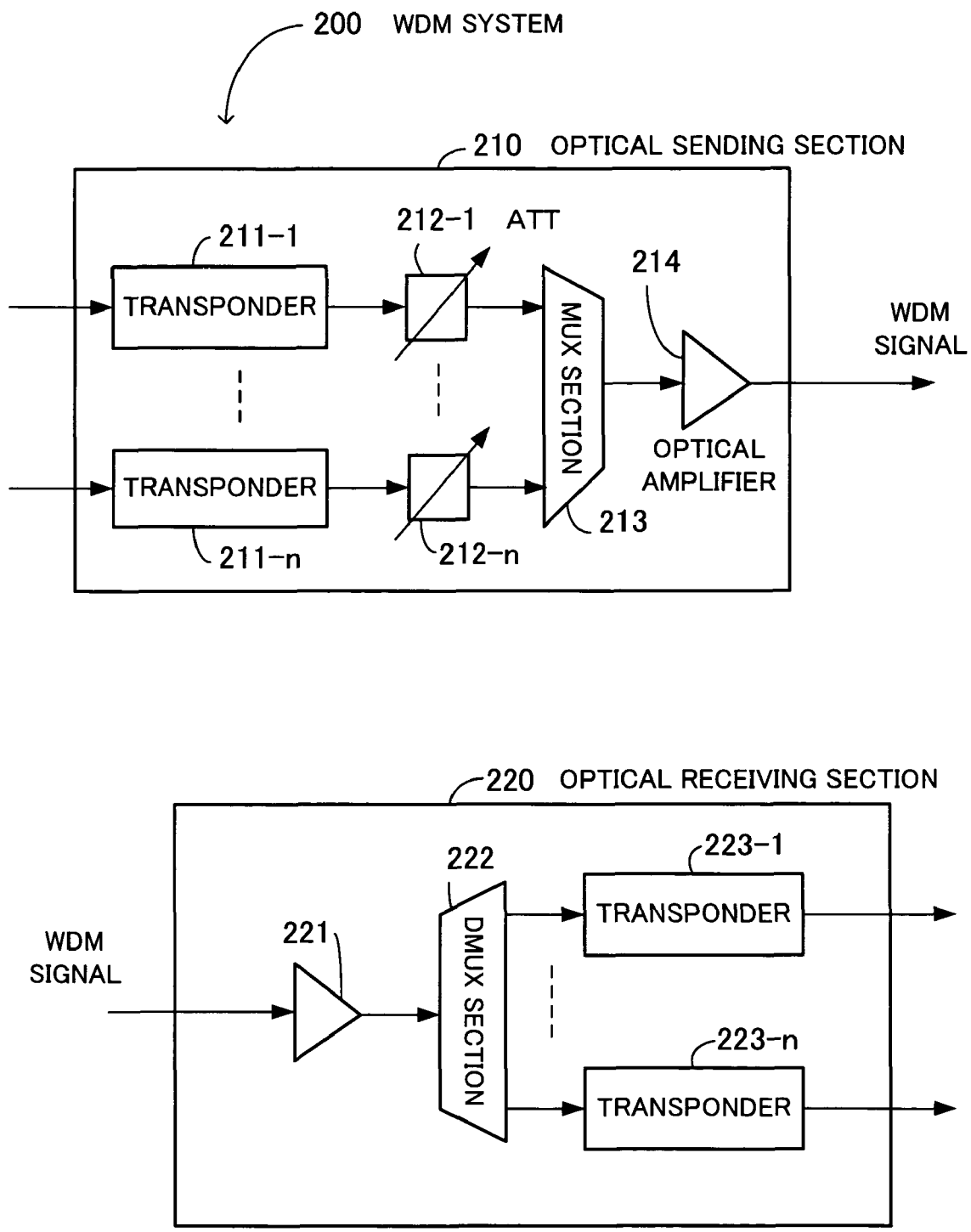
FIG. 14 shows the structure of a WDM system.

A WDM system including the optical transmission apparatus 10 according to the present invention which performs line speed limitation will now be described. FIG. 9 shows the structure of a WDM system including the optical transmission apparatus 10. In a WDM system 100, an optical sending section 110 includes transponders (bit free transponders) 111-1 through 111-n, ATTs 112-1 through 112-n, a MUX section 113, and an optical amplifier 114 and an optical receiving section 120 includes an optical amplifier 121, a DMUX section 122, and transponders (bit free transponders) 123-1 through 123-n. The operation of each component has been described in FIG. 14, so a description of it will be omitted.

The optical transmission apparatus 10 according to the present invention which performs line speed limitation should be located at A1 through An, B1 through Bn, C1 through Cn, or D1 through Dn in FIG. 9. If n optical transmission apparatus 10 each of which can handle one wavelength are located at, for example, A1 through An, then there is no need to locate the optical transmission apparatus 10 at B1 through Bn, C1 through Cn, or D1 through Dn.

In addition, one optical transmission apparatus 10 which can handle all wavelengths used in the WDM system may be located at a point E on an optical transmission line (that is to say, on an optical transmission line between stations) between the optical sending section 110 and the optical receiving section 120 through which wavelength multiplexed WDM signals run. By doing so, the line speeds of the WDM signals can be limited in block.

Figure 10:
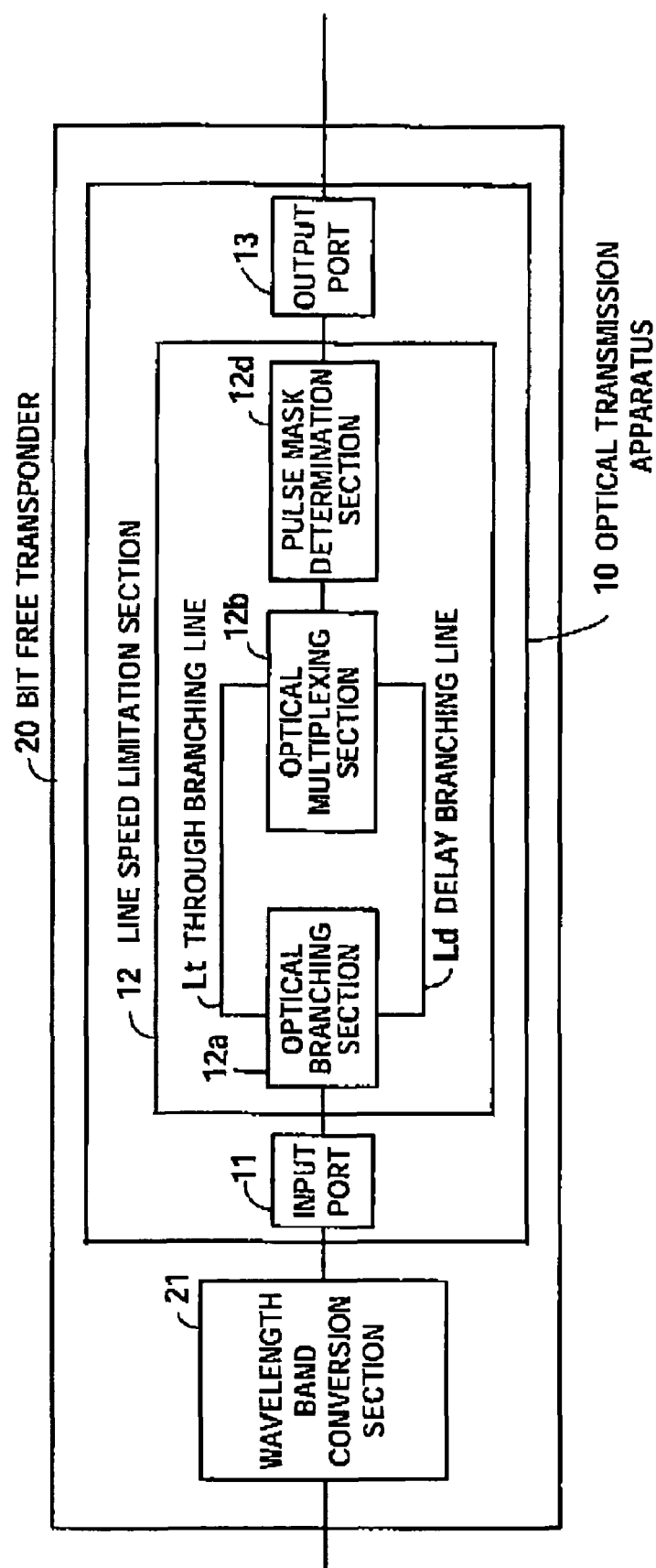
FIG. 10 shows the structure of a bit free transponder.

A bit free transponder (transponder apparatus according to the present invention) including the optical transmission apparatus 10 will now be described. FIG. 10 shows the structure of a bit free transponder. A bit free transponder 20 includes a wavelength band conversion section 21 and the optical transmission apparatus 10.

The wavelength band conversion section 21 performs wavelength band conversion regardless of the line speed of an input optical signal. If the input optical signal is sent from a user, then the wavelength band of the input optical signal is converted to a narrow wavelength band suitable for WDM. If the input optical signal is a WDM narrow-band optical signal, then the wavelength band of the input optical signal is converted to a wavelength band suitable for a unit on the user side and the input optical signal is outputted. The optical transmission apparatus 10 controls acceptance of the line speed of the optical signal the wavelength band of which is converted. The structure and operation of the optical transmission apparatus 10 are stated above, so descriptions of them will be omitted. In FIG. 9, the wavelength band conversion section 21 is located in front of the optical transmission apparatus 10. However, the wavelength band conversion section 21 may be located behind the optical transmission apparatus 10. In this case, the line speed of a multiplexed signal is limited and the wavelength band of the multiplexed signal is converted.

By locating the optical transmission apparatus 10 in the bit free transponder in this way and using this transponder as the transponders 111-1 through 111-n and 123-1 through 123-n shown in FIG. 9, the size of the system can be reduced.

The case where the optical transmission apparatus 10 is applied to a λ-VPN system will now be described. A virtual private network (VPN) is a virtual private communication network built by connecting points. For example, a service provided by a common carrier can be used like a dedicated line by using a network built in-house. A system built by assigning an optical wavelength to each path in a VPN is referred to as a λ-VPN.

Figure 11:
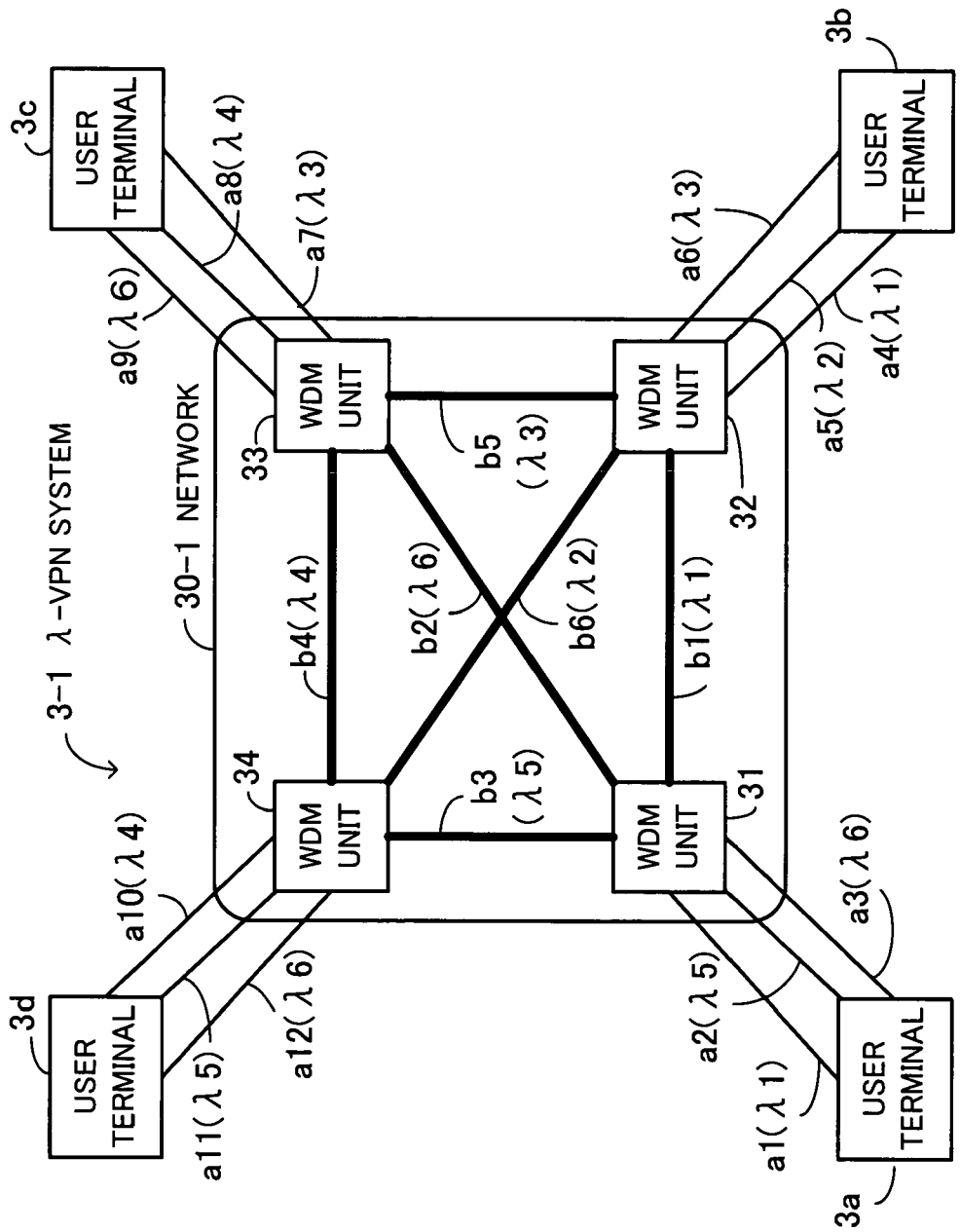
FIG. 11 shows the structure of a λ-VPN system.

FIG. 11 shows the structure of a λ-VPN system. A λ-VPN system 3-1 comprises a network 30-1 and user terminals 3a through 3d. The network 30-1 includes WDM units 31 through 34 as access line terminating apparatus.

The user terminal 3a connects with the WDM unit 31 via three access lines a1 through a3. Wavelengths λ1, λ5, and λ6 are assigned to the access lines a1 through a3 respectively. The user terminal 3b connects with the WDM unit 32 via three access lines a4 through a6. The wavelength λ1 and wavelengths λ2 and λ3 are assigned to the access lines a4 through a6 respectively. The user terminal 3c connects with the WDM unit 33 via three access lines a7 through a9. The wavelength λ3, a wavelength λ4, and the wavelength λ6 are assigned to the access lines a7 through a9 respectively. The user terminal 3d connects with the WDM unit 34 via three access lines a10 through a12. The wavelengths λ4, λ5, and λ6 are assigned to the access lines a10 through a12 respectively.

In the network 30-1, the WDM unit 31 connects with the WDM unit 32 via a backbone line b1 to which the wavelength λ1 is assigned, connects with the WDM unit 33 via a backbone line b2 to which the wavelength λ6 is assigned, and connects with the WDM unit 34 via a backbone line b3 to which the wavelength λ5 is assigned. The WDM unit 32 connects with the WDM unit 34 via a backbone line b6 to which the wavelength λ2 is assigned, and connects with the WDM unit 33 via a backbone line b5 to which the wavelength λ3 is assigned. The WDM unit 33 connects with the WDM unit 34 via a backbone line b4 to which the wavelength λ4 is assigned.

It is assumed that communication is performed between user terminals in the λ-VPN system 3-1 having the above structure. If the line speed of a signal sent from a user terminal must be limited so that it will be lower than or equal to a line speed settled by contract, an optical transmission apparatus which is available for a signal with a wavelength assigned to each access line should be located on each of the access lines a1 through a12 which connect the WDM units and the user terminals (for example, an optical transmission apparatus which can limit the line speed of a signal with the wavelength λ1 should be located on the access line a1). An optical transmission apparatus which is available for a signal with a wavelength assigned to each backbone line may be located instead on each of the backbone lines b1 through b6 (for example, an optical transmission apparatus which can limit the line speed of a signal with the wavelength λ1 may be located on the backbone line b1). An optical transmission apparatus which can limit the line speeds of signals with any one of the wavelengths λ1 through λ6 in block may be located instead for the backbone lines b1 through b6.

Figure 12:
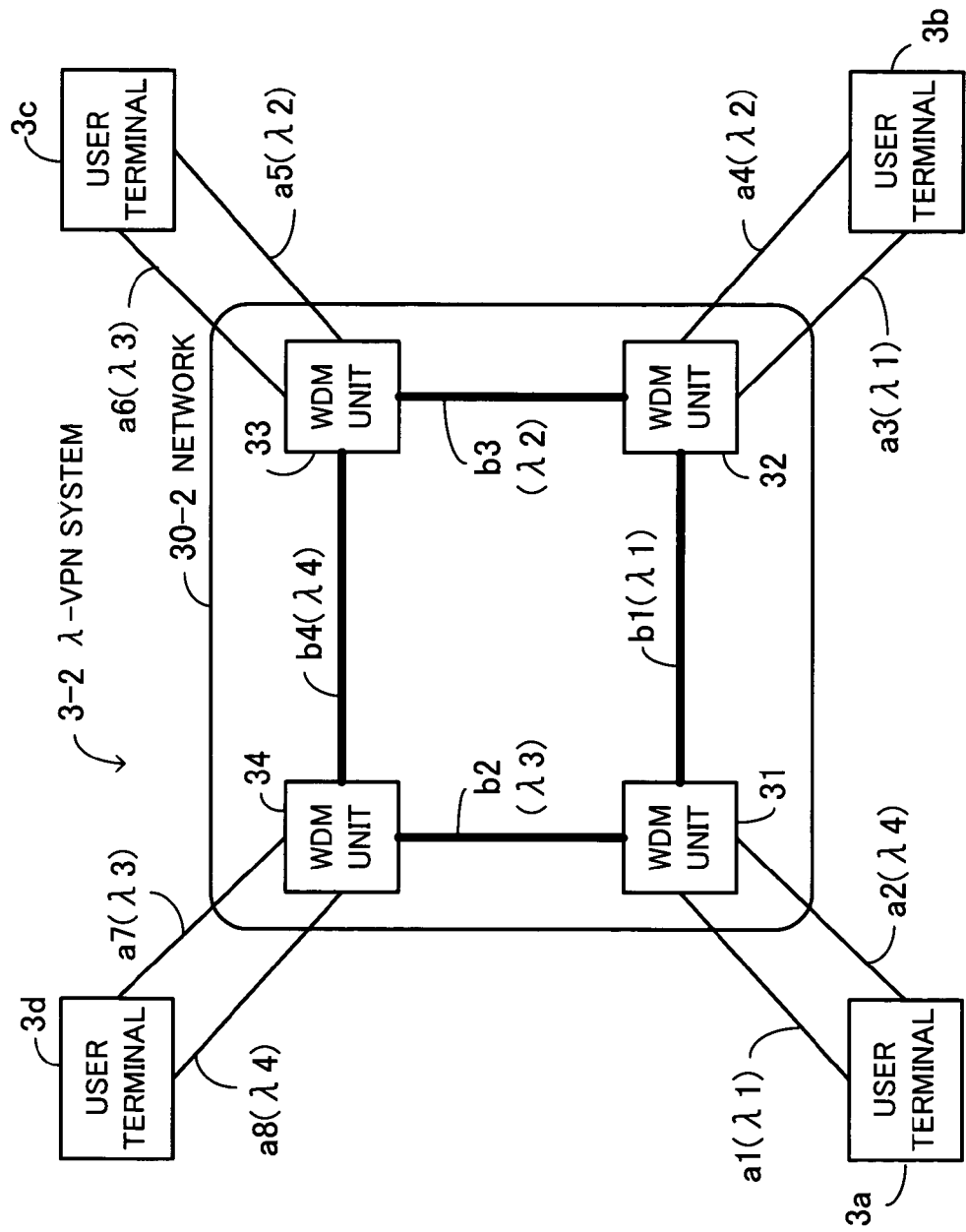
FIG. 12 shows the structure of a λ-VPN system.

FIG. 12 shows the structure of a λ-VPN system. In a λ-VPN system 3-2, data is multicast and is received only by a user terminal which is the destination of the data. The λ-VPN system 3-2 comprises a network 30-2 and user terminals 3a through 3d. The network 30-2 includes WDM units 31 through 34 as access line terminating apparatus.

The user terminal 3a connects with the WDM unit 31 via two access lines a1 and a2. Wavelengths λ1 and λ4 are assigned to the access lines a1 and a2 respectively. The user terminal 3b connects with the WDM unit 32 via two access lines a3 and a4. The wavelength λ1 and a wavelength λ2 are assigned to the access lines a3 and a4 respectively. The user terminal 3c connects with the WDM unit 33 via two access lines a5 and a6. The wavelength λ2 and a wavelength 3 are assigned to the access lines a5 and a6 respectively. The user terminal 3d connects with the WDM unit 34 via two access lines a7 and a8. The wavelengths λ3 and λ4 are assigned to the access lines a7 through a8 respectively.

In the network 30-2, the WDM unit 31 connects with the WDM unit 32 via a backbone line b1 to which the wavelength λ1 is assigned, and connects with the WDM unit 34 via a backbone line b2 to which the wavelength λ3 is assigned. The WDM unit 33 connects with the WDM unit 32 via a backbone line b3 to which the wavelength λ2 is assigned, and connects with the WDM unit 34 via a backbone line b4 to which the wavelength λ4 is assigned.

It is assumed that communication is performed between the user terminals 3a and 3c in the λ-VPN system 3-2 having the above structure. Data sent from the user terminal 3a reaches the user terminal 3b. The data which reaches the user terminal 3b flows to the user terminal 3c. The data which reaches the user terminal 3c flows to the user terminal 3d. As a result, the data reaches all of the user terminals 3b, 3c, and 3d. Each user terminal determines whether it is the destination of the data. Each user terminal receives the data only if it is the destination of the data. In this case, only the user terminal 3c receives the data sent from the user terminal 3a.

It is assumed that communication is performed between user terminals. If the line speed of a signal sent from a user terminal must be limited so that it will be lower than or equal to a line speed settled by contract, an optical transmission apparatus which is available for a signal with a wavelength assigned to each access line should be located on each of the access lines a1 through a8 which connect the WDM units and the user terminals. An optical transmission apparatus which is available for a signal with a wavelength assigned to each backbone line may be located instead on each of the backbone lines b1 through b4. An optical transmission apparatus which can limit the line speeds of signals with any one of the wavelengths λ1 through λ4 in block may be located instead for the backbone lines b1 through b4.

Figure 13:
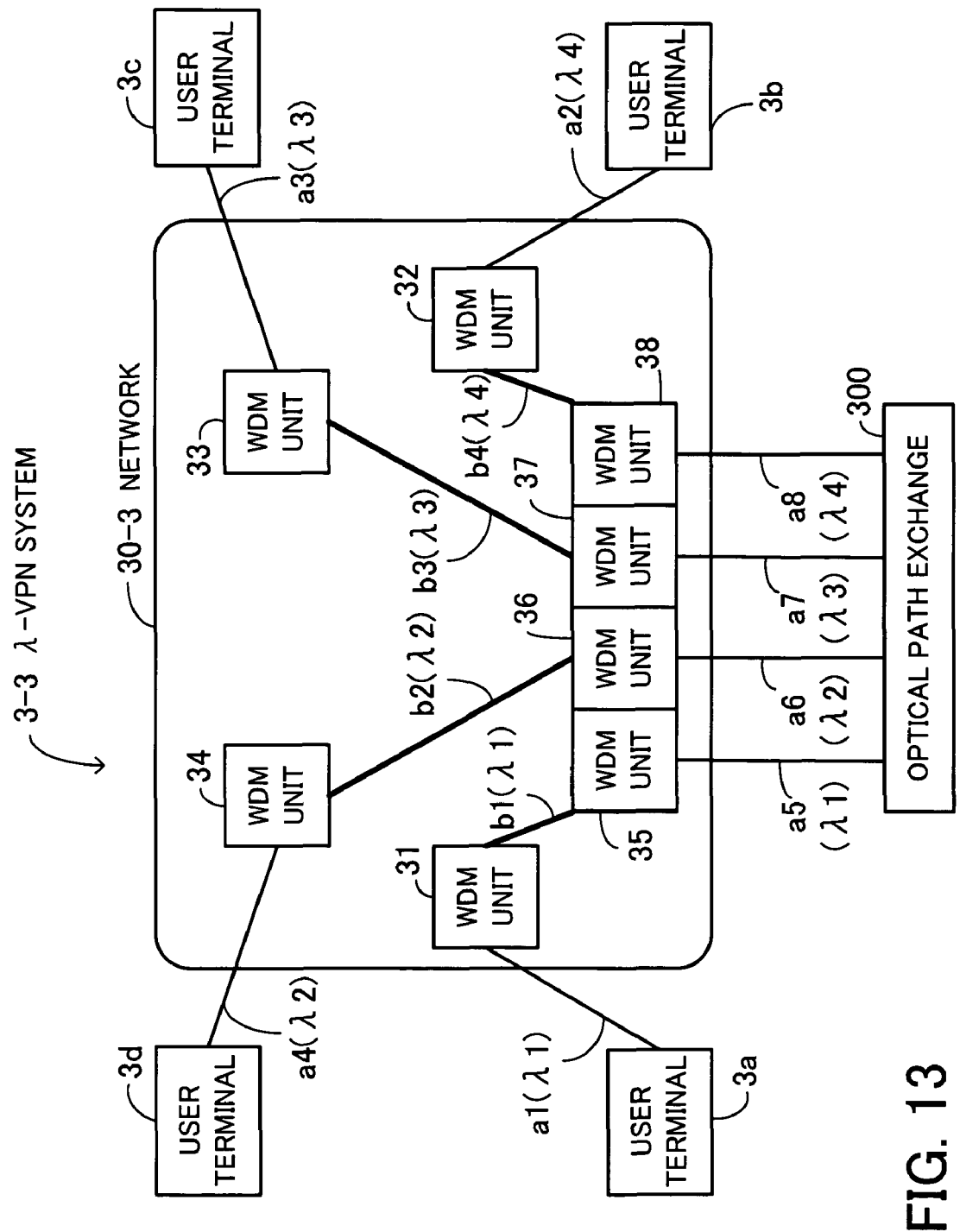
FIG. 13 shows the structure of a λ-VPN system.

FIG. 13 shows the structure of a λ-VPN system. In a λ-VPN system 3-3, communication is performed by routing data with an optical path exchange 300. The λ-VPN system 3-3 comprises a network 30-3, user terminals 3a through 3d, and the optical path exchange 300. The network 30-3 includes WDM units 31 through 38 as access line terminating apparatus.

The user terminal 3a connects with the WDM unit 31 via an access line a1 to which a wavelength λ1 is assigned. The user terminal 3b connects with the WDM unit 32 via an access line a2 to which a wavelength λ4 is assigned. The user terminal 3c connects with the WDM unit 33 via an access line a3 to which a wavelength λ3 is assigned. The user terminal 3d connects with the WDM unit 34 via an access line a4 to which a wavelength λ2 is assigned. The optical path exchange 300 connects with the WDM units 35 through 38 via four access lines a5 through a8 respectively. The wavelengths λ1 through λ4 are assigned to the access lines a5 through a8 respectively.

In the network 30-3, the WDM unit 31 connects with the WDM unit 35 via a backbone line b1 to which the wavelength λ1 is assigned. The WDM unit 32 connects with the WDM unit 38 via a backbone line b4 to which the wavelength λ4 is assigned. The WDM unit 33 connects with the WDM unit 37 via a backbone line b3 to which the wavelength λ3 is assigned. The WDM unit 34 connects with the WDM unit 36 via a backbone line b2 to which the wavelength λ2 is assigned.

It is assumed that communication is performed between the user terminals 3a and 3c in the λ-VPN system 3-3 having the above structure. Data is sent from the user terminal 3a to the optical path exchange 300 via the WDM units 31 and 35. The optical path exchange 300 recognizes that the destination of the data is the user terminal 3c. The optical path exchange 300 sends the data sent from the user terminal 3a to the user terminal 3c via the WDM units 37 and 33.

It is assumed that communication is performed between user terminals. If the line speed of a signal sent from a user terminal must be limited so that it will be lower than or equal to a line speed settled by contract, an optical transmission apparatus which is available for a signal with a wavelength assigned to each access line should be located on each of the access lines a1 through a4 which connect the WDM units and the user terminals. An optical transmission apparatus which is available for a signal with a wavelength assigned to each access line may be located instead on each of the access lines a5 through a8 which connect the WDM units and the optical path exchange. An optical transmission apparatus which is available for a signal with a wavelength assigned to each backbone line may be located instead on each of the backbone lines b1 through b4. An optical transmission apparatus which can limit the line speeds of signals with any one of the wavelengths λ1 through λ4 in block may be located instead for the backbone lines b1 through b4.

The optical transmission apparatus according to the present invention makes an optical signal branch in two directions, passes one optical signal in its original condition, delays the other optical signal, and combines the two optical signals again to generate a multiplexed optical signal. In this case, if the optical signal is sent at a line speed lower than or equal to a line speed settled under contract with a user and is to be passed, the multiplexed optical signal meets a pulse mask standard for an optical signal to be passed. If the optical signal is sent at a line speed higher than the line speed settled under contract with the user and acceptance of the optical signal is to be refused, a delay amount for generating the multiplexed optical signal that does not meet a pulse mask standard for an optical signal acceptance of which is to be refused is set. By doing so, acceptance of the line speed of the input optical signal is limited. As a result, a guard mechanism by which a optical signal sent at a certain line speed cannot be transmitted can be set. Therefore, communication charges first settled under contract with the user can be maintained and the reliability of system operation can be improved.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical transmission apparatus comprising:
an input port which inputs an optical signal from a line;
an optical branching section which branches the optical signal into a first optical signal and a second optical signal;
a delay branching line which delays the second optical signal by a delay amount and an optical multiplexing section which combines the first optical signal and the second optical signal into a multiplexed optical signal; and
a pulse mask determination section which generates a pulse mask of the multiplexed optical signal by controlling the delay amount and limits acceptance of a line speed of the optical signal,
wherein, when the optical signal is sent at a line speed lower than or equal to a line speed specified by a contract with a user, the pulse mask determination section causes the pulse mask not to lose its shape by controlling the delay amount and accepts an input of the optical signal, and
wherein, when the optical signal is sent at a line speed higher than a line speed specified by a contract with a user, the pulse mask determination section causes the pulse mask to lose its shape by controlling the delay amount and refuses an input of the optical signal.

2. The optical transmission apparatus according to claim 1, wherein:
optical fiber cables are used as a through branching line and the delay branching line; and
the delay amount is set by controlling a difference in length between the optical fiber cables used as the through branching line and the delay branching line,
wherein the through branching line passes the first optical signal in an original condition.

3. An optical transmission apparatus comprising:
an input port which inputs an optical signal from a line;
an optical branching section which branches the optical signal into a first optical signal and a second optical signal;
a plurality of switch sections which turns a switch on the basis of a designation signal and which receives and outputs the second optical signal;
a plurality of delay branching lines connected to the plurality of switch sections which delays the second optical signal by delay amounts which differ among the plurality of delay branching lines;
a switch control section which outputs the designation signal for selecting switching,
an optical multiplexing section which combines the first optical signal and the second optical signal into a multiplexed optical signal; and
a pulse mask determination section which generates a pulse musk of the multiplexed optical signal by controlling the delay amount and limits acceptance of a line speed of the optical signal,
wherein, when the optical signal is sent at a line speed lower than or equal to a line speed specified by a contract with a user, the pulse mask determination section causes the pulse mask not to lose its shape by controlling the delay amount and accepts an input of the optical signal, and
wherein, when the optical signal is sent at a line speed higher than a line speed specified by a contract with a user, the pulse mask determination section causes the pulse mask to lose its shape by controlling the delay amount and refuses an input of the optical signal.

4. The optical transmission apparatus according to claim 3, wherein:
optical fiber cables are used as a through branching line and the plurality of delay branching lines; and
the delay amount is set by controlling a difference in length between the optical fiber cables used as the through branching line and the plurality of delay branching lines,
wherein the through branching line passes the first optical signal in an original condition.

5. A WDM system comprising:
an optical sending unit comprising:
n sending-end transponders which converts wavelength bands of n optical signals with different wavelengths to wavelength bands for WDM,
n sending-end line speed limitation elements located in front of or behind the n sending-end transponders in the case of not being located at a receiving end or between stations and each comprising:
an optical branching section which makes an optical signal into a first optical signal and a second optical signal,
a delay branching line which delays the second optical signal by a delay amount,
an optical multiplexing section which combines the first optical signal and the second optical signal into a multiplexed optical signal, and
a pulse mask determination section which limits acceptance of a line speed of an input optical signal with a specific wavelength, by generating the multiplexed optical signal that meets a pulse mask standard for an input optical signal to be passed for the input optical signal which is sent at a line speed lower than or equal to a line speed settled under contract with a user and which is to be passed and by setting the delay amount for generating the multiplexed optical signal that does not meet a pulse mask standard for an input optical signal acceptance of which is to be refused for the input optical signal which is sent at a line speed higher than the line speed settled under contract with the user and acceptance of which is to be refused,
n optical attenuators which controls optical power of the band-converted optical signals,
a multiplexing section which combines the n level-lowered optical signals with different wavelengths to generate a WDM signal, and
an optical sending amplifier which amplifies the WDM signal; and
an optical receiving unit comprising:
an optical receiving amplifier which receives and amplifies the WDM signal,
a demultiplexing section which separates the amplified WDM signal into the n wavelength,
n receiving-end transponders which converts the wavelength bands of the n optical signals with different wavelengths to the wavelength bands for the user, and
n receiving-end line speed limitation elements located in front of or behind the n receiving-end transponders in the case of not being located at the sending end or between the stations, equal to the n sending-end line speed limitation elements in function, and each including the optical branching section, the delay branching line, the optical multiplexing section and the pulse mask determination.

* * * * *

UNITED STATES PATENT AND TRADEMARK OFFICE
CERTIFICATE OF CORRECTION

PATENT NO.       : 7,853,146 B2
APPLICATION NO.  : 11/496499
DATED            : December 14, 2010
INVENTOR(S)      : Makoto Takakuwa et al.

It is certified that error appears in the above-identified patent and that said Letters Patent is hereby corrected as shown below:

In claim 3, Column 15, line 56, change "musk" to --mask--.

Signed and Sealed this
First Day of March, 2011

David J. Kappos
*Director of the United States Patent and Trademark Office*